May 19, 1925.  1,538,824
J. L. KIMBALL
APPARATUS FOR AUTOMATIC SPEED CONTROL OF ELECTRIC MOTORS
Filed June 19, 1924  2 Sheets-Sheet 1

INVENTOR
James Lewis Kimball

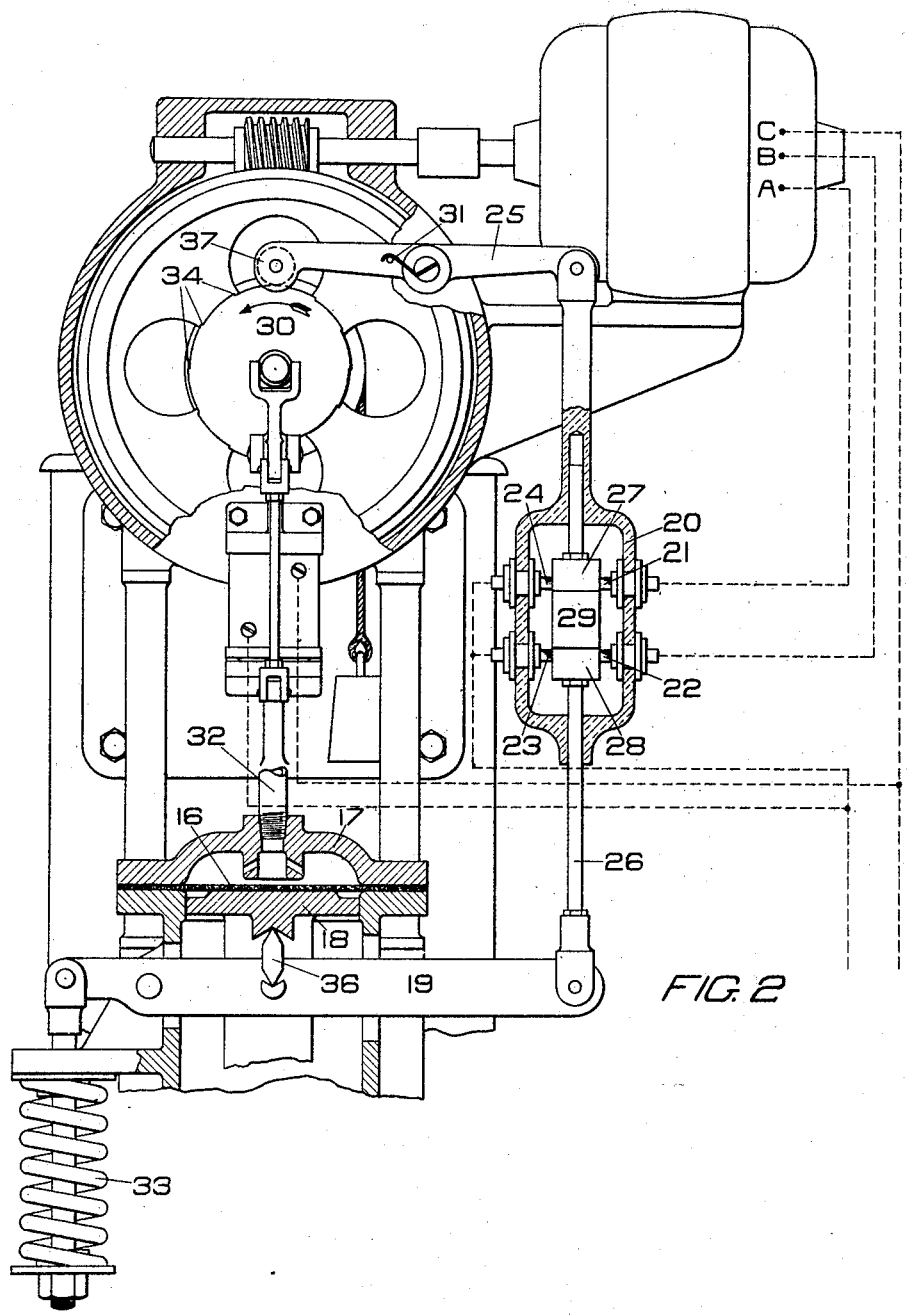

Patented May 19, 1925.

1,538,824

UNITED STATES PATENT OFFICE.

JAMES LEWIS KIMBALL, OF SALEM, MASSACHUSETTS, ASSIGNOR TO RUGGLES-KLINGE-MANN MFG. CO., OF SALEM, MASSACHUSETTS, A CORPORATION OF MASSACHUSETTS.

APPARATUS FOR AUTOMATIC SPEED CONTROL OF ELECTRIC MOTORS.

Application filed June 19, 1924. Serial No. 721,098.

*To all whom it may concern:*

Be it known that I, JAMES LEWIS KIMBALL, a citizen of the United States, residing at 9 Dearborn St., Salem, Mass., in the county of Essex and State of Massachusetts, have invented certain new and useful Improvements in Apparatus for Automatic Speed Control of Electric Motors, of which the following is a specification.

This invention relates to improvements in operating drum controllers and the like for controlling the speed of motors from variations in pressure in a pressure system.

One of the objects of the invention is to provide a self-contained unit which can be mounted in connection with drum controllers, rheostats, dial switches, or used for the control of variable speed brush shifting motors, and which may be included as a part of the motor control equipment.

Another object of the invention is to provide a magnet clutch which on failure of the current supply will release the operating device from the motor controller, and to provide means whereby the controller will be moved to its initial or off position when so released.

It will be understood that drum controllers and the like motor controlling devices are used to control the speed of variable speed motor driven pumps which supply fluid to a fluid pressure system, and that it is desirable to control such equipment from the pressure attained in the system.

While I have described and illustrated my invention as applied to drum controllers, it should be understood that there are various types of motor controlling devices for cutting in or cutting out speed controlling resistance units used in the control of variable speed motors and my invention is equally applicable to all types of speed controlling devices.

Heretofore, it has been customary to use a pressure regulator mounted independent of the controller and to operate the controller by means of a cable extending over a drum or sheave on the controller shaft.

My improvement consists essentially of operating a small motor with suitable gearing connected direct to the controller, this small motor being controlled by a pressure sensitive device all assembled as one complete unit.

The principal feature of the invention consists of a magnet clutch which releases the small motor from the controller on a failure of the current supply, with means to return the controller to its starting position.

This, and other improvements which constitute the invention are set forth in detail in the following specifications, and are pointed out in the appended claims.

Referring to the drawings;

Fig. 2, shows a rear elevation looking toward the back of the controller; the pressure responsive device, gear casing, and switch being shown in section.

Similar reference characters designate similar parts in the two views.

Figure 1:
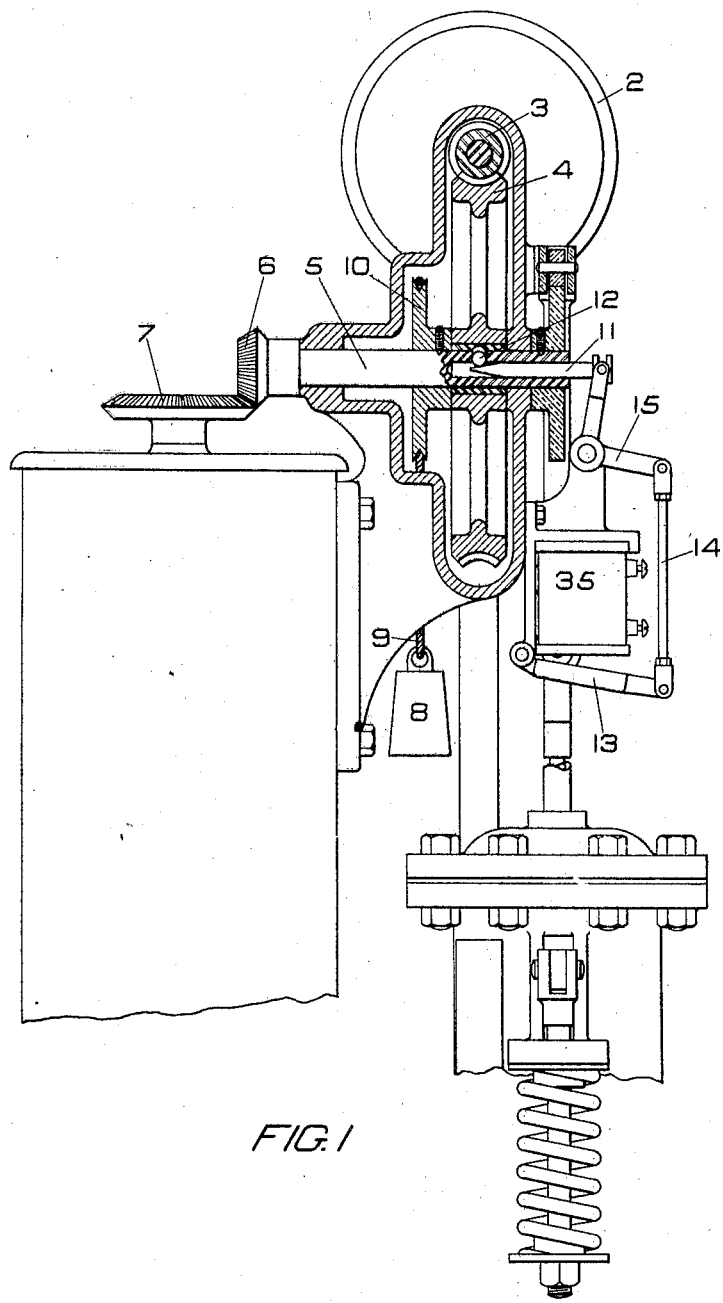
Fig. 1 shows a vertical side elevation of my invention. For the purpose of clearness the gear casing is shown in section.

Referring to Fig. 1, (1) represents the controller. (2) is the motor which actuates the controller, (3) is a worm driven direct from the motor shaft, (4) is a worm gear mounted on the controller shaft (5), (6) and (7) are bevel gears for operating the controller, (8) is a counter weight which is attached to a cord (9), which extends over sheave (10), sheave (10) being fastened to controller shaft (5), controller shaft (5) is hollow at one end and has a spindle (11), which controls the position of a steel ball (12) which acts as a key to form a clutch between the worm gear (4) and the shaft (5). Spindle (11) is operated by magnet (35) which has armature (13), connecting link (14), and bell crank (15).

It will be seen that when the magnet (35) is energized, it will attract armature (13) and force spindle (11) into the hollow shaft (5) thereby forcing steel ball (12) into a recess in the hub of the worm gear (4) and drive the shaft (5), and when the magnet (35) is de-energized, it will release armature (13), and withdraw spindle (11) and allow the ball (12) to be forced back below the outer diameter of the shaft and the worm gear becomes released, after which the counter-weight (8) will operate the controller to its off position.

Referring to Fig. 2, diaphragm (16), diaphragm cover (17), pressure caps (18), lever (19), toggle (36), and pressure counteracting spring (33) represents a pressure responsive device for operating a controlling switch. The controlling switch can be of any preferred arrangement. We have shown an embodiment in which the frame of the switch (20) carries the contacting points (21), (22), (23), and (24), and the position of the frame of the switch and its contacting points is controlled by the position of the lever (25), the operation of which will be later explained. The body of the switch is mounted on rod (26) and comprises two insulating portions (27) and (28), and a contacting portion (29). These parts are all operated from the lever (19), independent of the switch frame (20). On the end of the controller shaft (5) is mounted a stepped cam (30); a lever (25) is pivoted at or near the centre, and its left hand end is held in engagement with the stepped cam (30) by means of a spring (31).

The pressure responsive device is connected with the pressure system by means of a pipe (32), and the motor (2) is connected to an electrical supply circuit by a wiring system as shown by dotted lines.

Assuming the switch to be in a neutral position as shown, variations in pressure acting on diaphragm (16) will actuate lever (19) to move the contacting switch to complete an electric circuit to the motor. This will operate the motor in either one direction or the other, depending upon whether there is an increase or decrease in pressure on the diaphragm. The magnet (35) being already energized by the closing of the main line switch not shown; the motor will drive the worm gear and the controller shaft to operate the controller.

Assuming an increase in pressure, diaphragm (16) will be forced downward, which will bring contacts (22) and (23) in circuit and current will be supplied at terminal (B) and the motor operated to move the controller to install additional resistance in the circuit to the pump motor not shown, and slow down the pump, and on a decrease in pressure acting on diaphargm (16), the spring (33) will force the diaphargm upward operating lever (19) and the switch to complete a circuit through contacts (21) and (24) which will supply current on terminal (A) and operate the controller to cut out resistance.

It will be understood that one side of the motor circuit, that connected with (C) is direct to the source of supply and that current is alternately supplied to (A) and (B) to operate the motor in either one direction or the other.

We will now explain how the action of the motor is compensated so it operates by steps, each step corresponding to one of the contact points on the controller. Assuming that current is being supplied at (A) through contacts (21) and (24) which would indicate pressure below normal, then the motor would operate cam (30), in the direction indicated by the arrow which would bring the roll (37) on the end of lever (25) on to a lower stepped position. This would raise the right hand end of the arm (25) and also the frame of the switch (20) which would bring the contact points (21) and (24) back on the insulating or non-conducting position (27) of the switch, which would stop the motor. Assuming an increase in pressure, current will be supplied at (B) and contact points (22) and (23) will be in circuit, this would operate cam (30) in the opposite direction indicated by the arrow, which would bring roll (37) on a higher stepped position and move the frame of the switch to the non-effective position and again stop the motor.

As previously explained, should the current supply fail for any reason, the magnet (35) will be de-energized which will operate spindle (11) to release the worm gear (4) from the controller shaft (5) and the counter weight (8) will return the controller to its initial or starting point and install full resistance in the pump motor circuit. When the current is again restored, the clutch will be thrown in by energizing of the magnet (35) and the controller will be operated until it reaches a position corresponding to the pressure setting of the pressure responsive device.

The steps on the cam (30) are indicated by (34). There can be any number of these steps to correspond to the number of control points on the drum controller.

It should be understood that the controller shaft is operated through any number of degrees not to exceed a complete circle and that its limits of operation is controlled by the limits of operations of the lever (19).

It will now be seen by those skilled in the art, that I have devised improved mechanism for controlling the operations of drum controllers, and that this novel device may be used in the control of motor driven pumps and the like. With this understanding, the invention is to be regarded as described and illustrated by, but not limited to, the above specifications and the accompanying drawings and to be defined by the appended claims, construed as indicated above.

What I claim is:

1. In a fluid pressure regulator, the combination with a motor controlling mechanism and a motor operated device for governing said mechanism, of an automatic clutch, associated with said device and adapted to disengage the motor operated device from the motor controlling mechanism on a failure of the motor operated device to control the motor controlling mechanism, and means to return the motor controlling mechanism to its neutral position when disengaged from the motor operated device.

2. In a fluid pressure regulator, the combination with a motor controlling mechanism of a magnet clutch associated with said device and adapted to render the device inoperative upon deenergization of the magnet.

3. In combination with a speed controlling device for electric motors of pressure controlled apparatus for controlling the speed controlling device, said pressure controlled apparatus comprising a rotatable shaft having an angle of rotation of less than one full revolution, an electrically reversible motor for driving said shaft, speed reduction gearing between the motor and said shaft, a controlling switch having an open circuit position and two closed circuit positions adapted to control the operation of the motor and its direction of rotation, a pressure responsive device for operating said switch to either of its closed circuit positions, and means operated by the motor regardless of its direction of rotation for returning the switch to its open circuit position, and means due to a failure of the current supply to actuate the speed controlling device to its initial position.

4. In combination with a speed controlling device for electric motors, pressure controlled apparatus for controlling the speed controlling device, said pressure controlled apparatus comprising an electrically reversible motor, a controlling switch for said motor, said switch having an open circuit position and two closed circuit positions adapted to control the operation of the motor and its direction of rotation, a pressure sensitive device for operating said switch to either of its closed circuit positions, and means operated by the motor regardless of its direction of rotation for returning said switch to its open circuit position to cause a step by step operation of said motor, and an undervoltage device for preventing a current supply to the first named motor in excess of the speed relation of said motor.

5. In pressure control apparatus comprising an electric motor connected to a supply circuit, a pressure contacting device for controlling the operation of said motor, impelling means operated by said motor for controlling the pressure, a magnet clutch arranged to disengage said motor from the impelling means upon failure of the current supply to said motor, and means to return said impelling means to a starting position when said impelling means is disengaged from the motor.

6. The combination with a speed controlling device for electric motors, a rotatable shaft for operating said device, pressure controlled apparatus mounted in conenction with said shaft, said pressure controlled apparatus comprising a motor and an operating element adapted to control the operation of said motor, a pressure responsive device and means whereby said operating element is controlled jointly by the pressure responsive device and by the operation of the motor, and an automatic clutch for releasing said motor from the operation of the controller shaft, upon failure of the motor to control the speed controlling device, and means for returning said speed controlling device to its starting position, when said motor is disconnected from the controller shaft.

7. The combination with a speed controlling device for electric motors, pressure controlled apparatus mounted in connection with said speed controlling device and assembled as a complete self contained unit, said pressure controlled apparatus comprising a motor and a controlling element adapted to control the operation of the motor, a pressure responsive device and means whereby said controlling element is controlled jointly by the pressure responsive device and by the operation of said motor.

8. In combination with a speed controlling device for electric motors, pressure controlled apparatus for controlling the speed controlling device comprising a motor and a controlling element adapted to control the operation of the motor, a pressure responsive device and means whereby said controlling element is controlled jointly by the pressure responsive device and by the operations of the motor, and an automatic clutch for disengaging said motor from said speed controlling device upon failure of said motor to control the speed controlling device.

9. The combination with a speed controlling device for electric motors, pressure controlled apparatuses for controlling the speed controlling device comprising an electric motor connected to a supply circuit, a controlling switch in said circuit adapted to control the operation of the motor and adapted to control its direction of rotation, a pressure responsive device and means whereby said switch is controlled jointly by the pressure responsive device and by the operation of the motor, and a magnet clutch energized by the supply circuit for releasing the motor from the speed controlling device on failure of the current supply to said motor, and means to return said speed controlling device to its initial or starting point when released from said motor.

10. In apparatus for automatic speed control of electric motors, the combination with a drum controller, and the like, having a shaft for operating the rotatable contacting element of said controller, of pressure controlled mechanism, comprising an electric motor mounted in connection with said controller, a supply circuit for said motor, a controlling switch in said circuit adapted to control the operation of the motor, said switch having a neutral position and two effective positions adapted to control the direction of rotation of the motor, a pressure sensitive device for moving the controlling switch to either of its effective positions for operating the motor, a stepped cam member mounted on said shaft and arranged to return the controlling switch to its neutral position at each stepped position and to cause a further variation in pressure acting on the pressure responsive device for a further operation of the motor, and a magnet clutch arranged, so that when said magnet is energized by the supply circuit that the motor is in operative engagement with the controller and when de-energized by failure of the current supply will disengage the motor from the controller, and means to return the controller to its initial position.

11. In pressure controlled apparatus comprising a rotatable shaft and means controlled by said shaft for controlling the pressure, an electrically reversible motor for driving said shaft, speed reduction gearing between the motor and said shaft, a stepped cam mounted on said shaft, a rocker arm operated by said cam, a controlling switch connected to said rocker arm, said switch having an open circuit position and two closed circuit positions adapted to control the operation of said motor and its direction of rotation, a pressure responsive device for operating said switch to either of its closed circuit positions, said switch being controlled alternately by the pressure responsive device and by said cam whereby a step by step control of the motor is effected.

12. In a fluid pressure regulator comprising a rotatable shaft having an angle of rotation of less than one full revolution and means controlled by said shaft for controlling the pressure, an electrically reversible motor for driving said shaft, speed reduction gearing between the motor and said shaft, a supply circuit for the motor, a controlling switch in said circuit, said switch having an open circuit position and two closed circuit positions adapted to control the motor and its direction of rotation, a pressure sensitive device controlled by the pressure to be regulated for operating the controlling switch to either of its closed circuit positions, a cam member mounted on said shaft and operated by the motor and means whereby said cam member returns said switch to its open circuit position at predetermined points in the operation of the motor, thereby causing a further variation in pressure acting on the pressure responsive device for a further operation of the motor.

JAMES LEWIS KIMBALL.